(12) United States Patent
Ichikawa

(10) Patent No.: US 8,537,253 B2
(45) Date of Patent: *Sep. 17, 2013

(54) DEFECT PIXEL DETECTION APPARATUS AND METHOD FOR DETECTING DEFECT PIXEL

(75) Inventor: Shigeru Ichikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,888

(22) Filed: Aug. 1, 2012

(65) Prior Publication Data

US 2012/0300101 A1    Nov. 29, 2012

Related U.S. Application Data

(63) Continuation of application No. 12/544,691, filed on Aug. 20, 2009, now Pat. No. 8,243,174.

(30) Foreign Application Priority Data

Aug. 29, 2008 (JP) ................................. 2008-222462

(51) Int. Cl.
  *H04N 9/64* (2006.01)
(52) U.S. Cl.
  USPC ............................ 348/246; 348/247; 348/241
(58) Field of Classification Search
  USPC .................................................. 348/246, 247
  See application file for complete search history.

(56) References Cited

U.S. PATENT DOCUMENTS

| 5,521,639 | A | 5/1996 | Tomura et al. |
| 7,508,975 | B2 | 3/2009 | Izumi et al. |
| 7,755,679 | B2 | 7/2010 | Rossi et al. |
| 7,760,258 | B2 | 7/2010 | Huang et al. |
| 8,026,964 | B2 | 9/2011 | Walter et al. |
| 8,072,513 | B2 | 12/2011 | Takenaka et al. |
| 8,111,306 | B2 | 2/2012 | Kuruma et al. |
| 2008/0197268 | A1 | 8/2008 | Kameda |
| 2008/0218609 | A1 | 9/2008 | Blanquart et al. |
| 2008/0278609 | A1 | 11/2008 | Otsuki |
| 2009/0040343 | A1 | 2/2009 | Kao |

FOREIGN PATENT DOCUMENTS

| JP | 2001-268448 A | 9/2001 |
| JP | 2004-222143 A | 8/2004 |
| JP | 2006-013988 A | 1/2006 |
| JP | 2007-235891 A | 9/2007 |

OTHER PUBLICATIONS

Office Action for Counterpart Japanese Application No. 2008-222462 dated Dec. 11, 2012.

*Primary Examiner* — Sinh Tran
*Assistant Examiner* — Christopher K Peterson
(74) *Attorney, Agent, or Firm* — Carter, DeLuca, Farrell & Schmidt LLP

(57) ABSTRACT

A defect pixel detection apparatus includes an image sensor which includes an effective pixel configured to have a photoelectric conversion element and an output unit configured to output a pixel signal generated by the photoelectric conversion element, a first reference pixel configured to have the same pixel configuration as the effective pixel and be optically shielded, and a second reference pixel configured to have a pixel configuration different from that of the effective pixel, a defect level acquiring unit configured to acquire a defect level of a target pixel in the image sensor, and a defect pixel determination unit configured to determine whether the target pixel is a defect pixel by comparing a defect level of the target pixel with a defect detection threshold according to a type of the pixel.

8 Claims, 8 Drawing Sheets

| SENSITIVITY A0 | Tv ≤ Tv1 | Tv1 < Tv ≤ Tv2 | Tv2 < Tv |
|---|---|---|---|
| Tth ≤ T1 | B11 | B12 | B13 |
| T1 < Tth ≤ T2 | B21 | B22 | B23 |
| T2 < Tth | B31 | B32 | B33 |

DEFECT PIXEL DETECTION APPARATUS AND METHOD FOR DETECTING DEFECT PIXEL

CROSS REFERENCE TO RELATED APPLICATIONS

This application is a continuation of U.S. patent application Ser. No. 12/544,691 filed Aug. 20, 2009, which claims the benefit of and priority to Japanese Patent Application No. 2008-222462 filed Aug. 29, 2008, each of which are hereby incorporated by reference herein in their entirety.

BACKGROUND OF THE INVENTION

1. Field of the Invention

The present invention relates to a defect pixel detection apparatus and a method for detecting a defect pixel. More specifically, the present invention relates to a technique for detecting a defect pixel of an image sensor in high accuracy.

2. Description of the Related Art

Concerning a solid-state image sensor used in an image sensing apparatus, e.g., charge coupled device (CCD) type image sensors and complementary metal oxide semiconductor (CMOS) type image sensors, it is known that, if there is a defect in a pixel, noise such as a dark current is generated in an output signal due to the defect of the pixel. If such phenomenon occurs in an optical black pixel section (OB section) or a dummy pixel section (Null section), the phenomenon adversely effects a clamp operation of each of the OB section and the Null section and causes a horizontal or vertical streak on an image.

The OB section is an area that includes a first pixel which includes a photoelectric conversion element such as a photodiode and a layer for outputting a signal generated by the photoelectric conversion element of which surface is optically shielded by, for example, aluminum. The Null section includes no photoelectric conversion element, or is an area including a second pixel that does not have the layer for outputting a signal generated by the photoelectric conversion element including the photoelectric conversion element.

The above described dark current fluctuates significantly according to a usage environment (e.g., an ambient temperature, exposure, or the like). Therefore, to obtain a high-quality image, a highly accurate detection of defect pixel and correction of thus detected defect pixel are required even when the usage environment changes. Japanese Patent Laid-open Publication No. 2004-222143 discusses a method for detecting a defect pixel. In this method, a threshold for determining defect in each pixel is set for every photographing condition, e.g., a photographing mode, a shutter speed, and sensitivity in order to accurately detect the defect in the pixel which changes according to the usage environment.

Japanese Patent Laid-open Publication No. 2001-268448 discusses another method for detecting a defect pixel. In this method, there are two detection units for an effective pixel section and the OB section, respectively, and a different detection threshold is set for each of the detection units. Each of the detection units calculates a temperature and exposure time, and an alarm is issued according to a detected defect level of temperature and exposure time.

The method discussed in the Japanese Patent Laid-open Publication No. 2004-222143, however, can not deal with an increase of a dark current caused by change of the ambient temperature. In other words, a detection threshold suitable for each defect level which varies according to the usage environment cannot be appropriately set. Therefore, the defect pixel cannot be detected in high accuracy, and the defect pixel may be erroneously corrected. As a result, a horizontal or vertical streak may be generated on an image after correction.

Further, this method requires that the OB section and the effective pixel section behave in a similar manner with respect to the change of the usage environment. However, as it is described above, the OB section, the Null section, and the effective pixel section have physically different pixel configurations. Therefore, a temperature dependency of the defect level is not always the same between those sections. As a result, the defect in the pixel cannot be detected in high accuracy in each of the sections and thus an erroneous correction may occur in each section if the usage environment changes.

In the method discussed in the Japanese Patent Laid-open Publication No. 2001-268448, a determination whether to accept an element is performed at a peak value of the defect level using the set threshold. Therefore, if there is even a single defect of a high level in the pixel, the element will be rejected. In other words, there is a problem that even the image sensor of a good quality may not be accepted due to a single defect in the OB section. Since the Null section has no threshold different from that of the OB section, there is another problem that the erroneous correction may be made due to a difference in pixel configuration.

SUMMARY OF THE INVENTION

The present invention is directed to a technique for detecting and correcting a defect in a pixel of an image sensor in high accuracy even if a usage environment changes.

According to an aspect of the present invention, a defect pixel detection apparatus includes an image sensor which includes an effective pixel configured to have a photoelectric conversion element and an output unit configured to output a pixel signal generated by the photoelectric conversion element, a first reference pixel configured to have the same pixel configuration as the effective pixel and be optically shielded, and a second reference pixel configured to have a pixel configuration different from that of the effective pixel, a defect level acquiring unit configured to acquire a defect level of a target pixel in the image sensor, and a defect pixel determination unit configured to determine whether the target pixel is a defect pixel by comparing a defect level of the target pixel with a defect detection threshold according to a type of the pixel.

According to another aspect of the present invention, a method for detecting a defect pixel of an image sensor which includes an effective pixel configured to have a photoelectric conversion element and an output unit configured to output a pixel signal generated by the photoelectric conversion element, a first reference pixel configured to have the same pixel configuration as that of the effective pixel and being optically shielded, and a second reference pixel configured to have a pixel configuration different from that of the effective pixel, includes acquiring a defect level of a target pixel in the image sensor, and determining whether the target pixel is a defect pixel by comparing a defect level of the target pixel with a defect detection threshold according to a type of the pixel.

With the above described configuration, the defect pixel of the image sensor can be detected in high accuracy according to the type of the pixel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
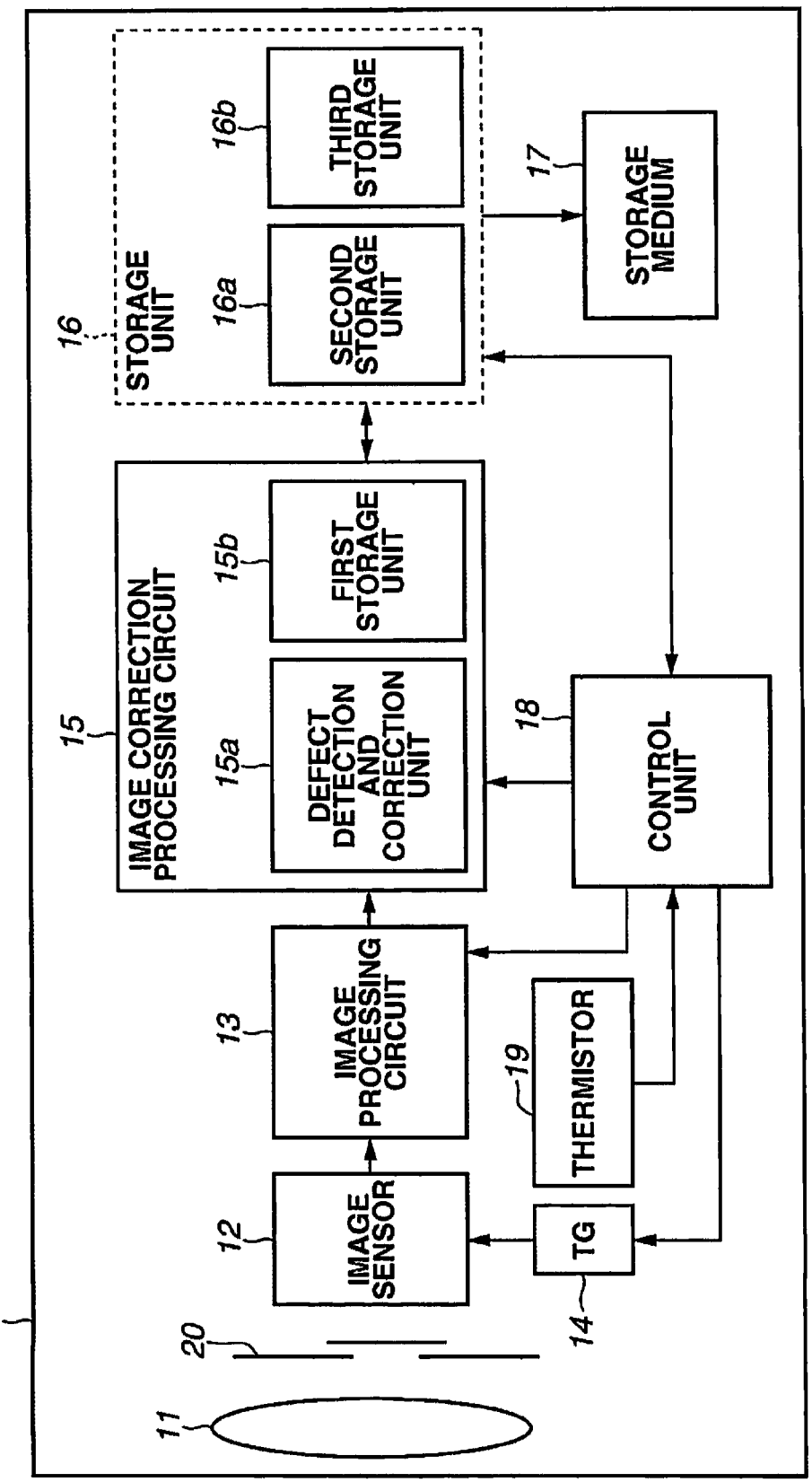
FIG. 1 is a functional block diagram illustrating an example of a configuration of an image sensing apparatus according to an exemplary embodiment of the present invention.

FIG. 1 is a block diagram illustrating an example of a configuration of a solid-state image sensing apparatus according to a first exemplary embodiment of the present invention. In the first exemplary embodiment, a digital still camera is described as an example of the solid-state image sensing apparatus.

Figure 2:
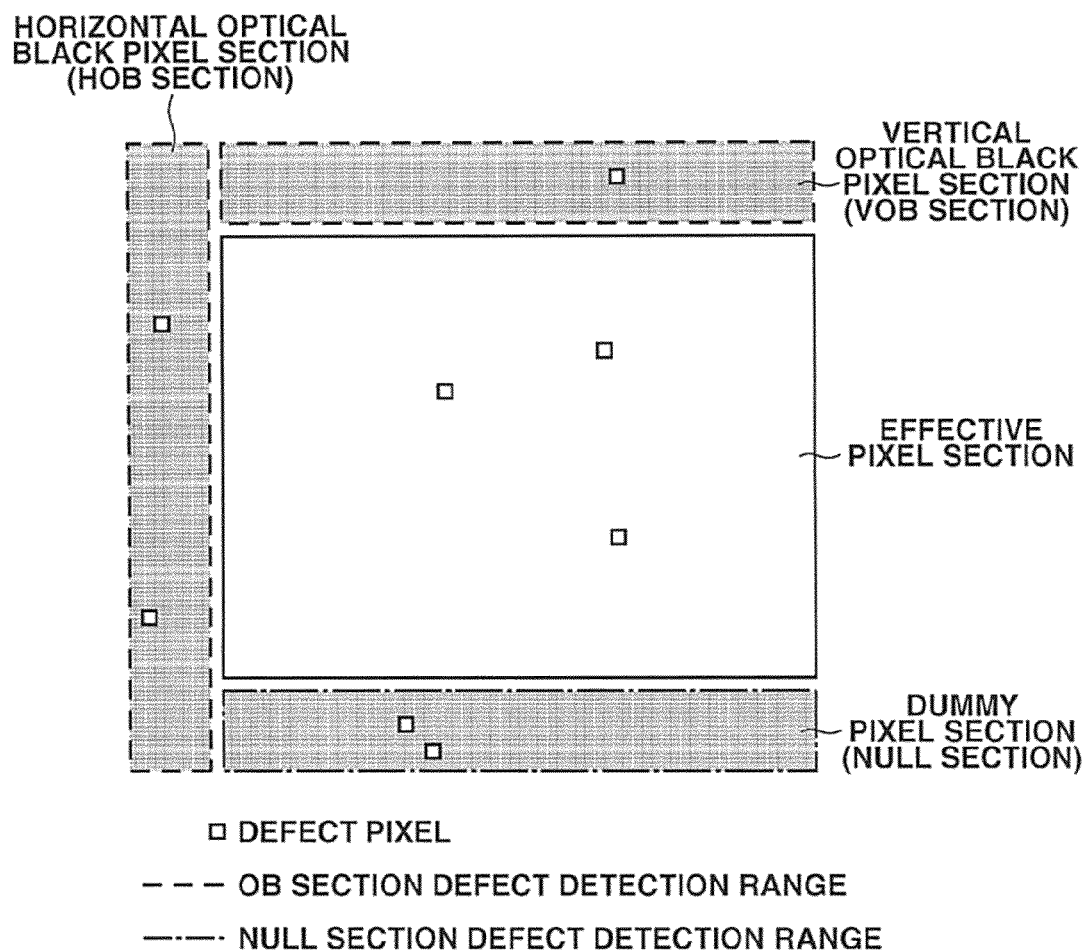
FIG. 2 is a configuration of a solid-state image sensor representing a range where a defect is to be detected and corrected.

A function of each unit will be described with reference to FIG. 1. FIG. 1 illustrates a digital still camera as a solid-state image sensing apparatus 10 of the first exemplary embodiment. The solid-state image sensing apparatus 10 includes a lens 11 which collects light from an object onto a solid-state image sensor 12, which converts the light into an electric signal. As illustrated in FIG. 2, the solid-state image sensor 12 includes an optical black pixel section (OB section), a dummy pixel section (Null section), and an effective pixel section.

The OB section is an area that includes a first pixel which includes a photoelectric conversion element such as a photodiode and a layer for outputting a signal generated by the photoelectric conversion element, and of which surface is optically shielded by, for example, aluminum. The OB section includes a horizontal optical black pixel section (HOB section) and a vertical optical black pixel section (VOB section). The Null section has no photoelectric conversion element, or is an area which includes a second pixel that does not include a layer for outputting a signal generated by a photoelectric conversion element though the Null section includes the photoelectric conversion element. The effective pixel section is an area including a pixel which includes a photoelectric conversion element and a layer for outputting a signal generated by the photoelectric conversion element, and outputs a signal corresponding to an amount of light coming into the photoelectric conversion element.

An image processing circuit 13 converts an analog video signal input from the solid-state image sensor 12 into a digital video signal. A timing generator (TG) 14 generates a pulse for driving the solid-state image sensor 12. An image correction processing circuit 15 corrects the digital video signal input from the image processing circuit 13 by using signal values output from the OB section and the Null section and obtains a corrected signal value of the effective pixel section. The image correction processing circuit 15 includes a defect detection and correction unit 15a which detects and corrects a defect in a pixel, and a first storage unit 15b for storing a setting value set by an external device, image data, and the like.

A second storage unit 16a stores photographing data, adjusting data, image data, data for correction, data for setting a defect detection threshold, and the like. The second storage unit 16a includes a random access memory (RAM) in the first exemplary embodiment. A third storage unit 16b stores adjusting data, data for setting a defect detection threshold, and the like. The third storage unit 16b includes a read only memory (ROM) in the first exemplary embodiment. A captured image storage medium 17 which is detachable from the digital still camera is a Compact Flash (registered mark) card in the first exemplary embodiment. The captured image storage medium 17 eventually stores the image data having been temporarily recorded in the storage units.

A control unit 18 controls all the functions of the solid-state image sensing apparatus 10. The control unit 18 includes a central processing unit (CPU) in the first exemplary embodiment. A thermistor 19 detects a temperature around the solid-state image sensor 12. It is desirable that the thermistor 19 is positioned near a pixel section of the solid-state image sensor 12 as much as possible. A mechanical shutter 20 controls exposure time of the solid-state image sensor 12.

Figure 3:
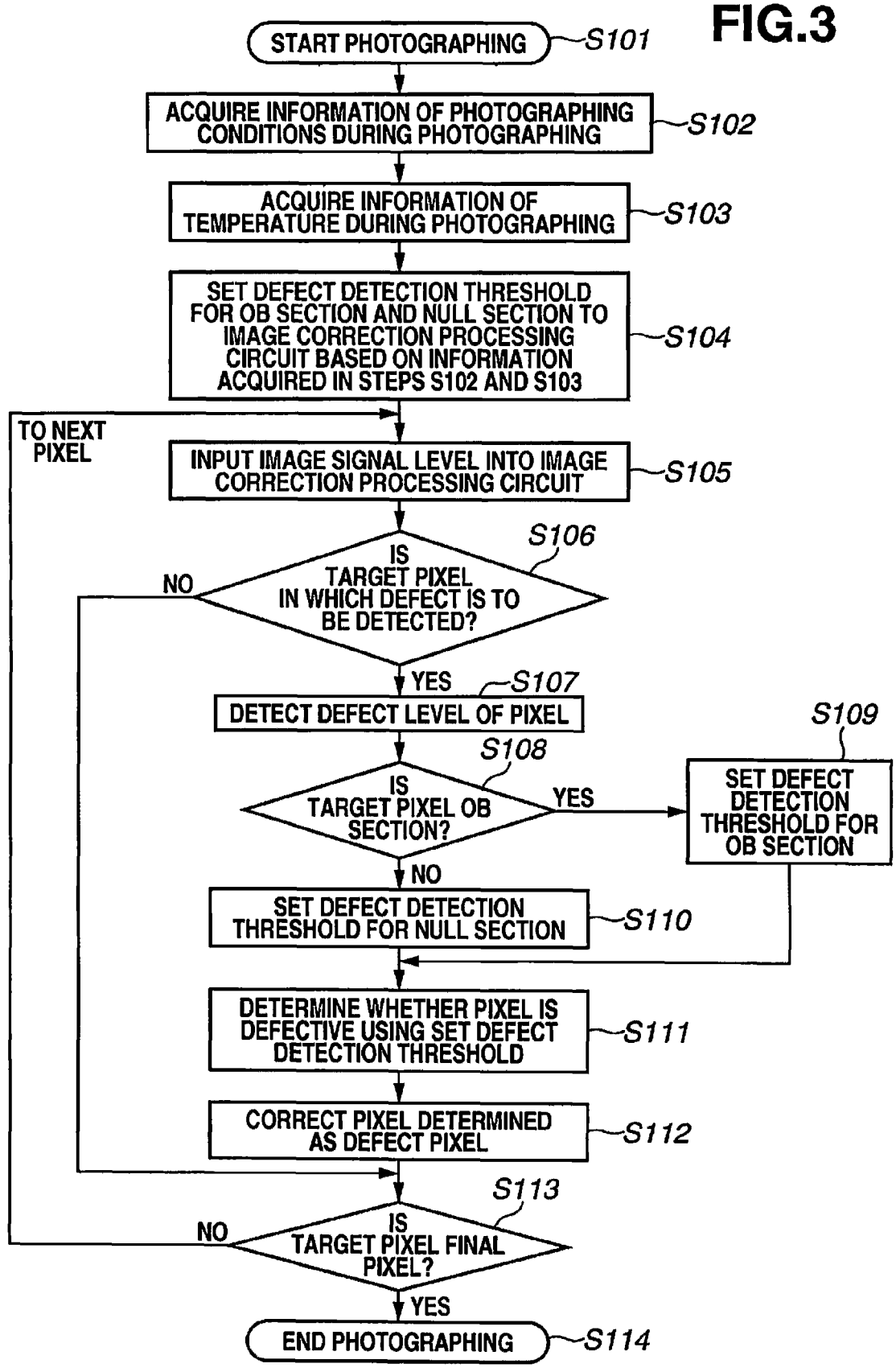
FIG. 3 is a flow chart illustrating a procedure for detecting and correcting a defect in a pixel.

A flow of operations for defect detection and correction processing in the image sensing apparatus of the first exemplary embodiment will be described below with reference to a flow chart of FIG. 3.

In the first exemplary embodiment, the defect detection and correction processing for the OB section and the Null section during the still image photographing will be described as an example. Further, the defect detection and correction processing according to the first exemplary embodiment is also suitable for when a plurality of sheets of images are photographed continuously, and the defect of sections other than the OB section and the Null section are detected and corrected. In such a case, with the similar configuration as described above, an identical effect can be produced.

When a user starts photographing in step S101, in step S102, the control unit 18 acquires information about photographing conditions set in the solid-state image sensor 12, the image processing circuit 13, and the TG 14. The information about the photographing conditions acquired in step S102 includes setting conditions such as a photographing mode, a shutter speed, and sensitivity.

Then, in step S103, the control unit 18 acquires an ambient temperature of the solid-state image sensor 12 from the thermistor 19. In step S104, the control unit 18 sets defect detection thresholds for the OB section and the Null section to the image correction processing circuit 15 based on the information acquired in steps S102 and S103.

Each of the second storage unit 16a and the third storage unit 16b preliminary stores defect detection thresholds for the OB section and the Null section with respect to the photographing conditions and an element temperature. The control unit 18 reads out values corresponding to the photographing conditions and the element temperature which are acquired in steps S102 and S103 among the defect detection thresholds stored in the second storage unit 16a or the third storage unit 16b. The control unit 18 causes the first storage unit 15b of the image correction processing circuit 15 to store thus read out values.

Figures 4, 5:
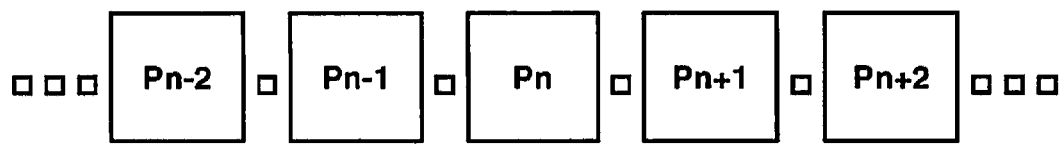
FIG. 4 illustrates a row of pixels in the vicinity of a target pixel.
FIG. 5 illustrates an example of stored defect detection thresholds.

FIG. 5 shows the defect detection thresholds stored in the third storage unit 16b. FIG. 5 shows defect detection thresholds B when sensitivity A is 0 with respect to a shutter speed Tv and a thermistor temperature Tth. In FIG. 5, a total of nine defect detection thresholds is shown. However, a number of defect detection thresholds stored in the third storage unit 16b may be increased or decreased for every photographing condition and element temperature according to features of the image sensor.

In step S105, the image processing circuit 13 sequentially converts analog signals output from the solid-state image sensor 12 into digital signals, and inputs the converted signals into the image correction processing circuit 15. The first storage unit 15b of the image correction processing circuit 15 stores, for example, address information of the OB section, the Null section, and the effective pixel section to be used in photographing, address information of a target pixel of which signal level is to be corrected, and address information of the target pixel with which an index value to be used in correction is calculated. Those pieces of the address information may be stored in the first storage unit 15b by the control unit 18 before the user starts photographing, or may be set during an adjustment process in a factory.

In step S106, the image correction processing circuit 15 determines whether the target pixel is a pixel in which a defect is to be detected, based on the above described address information. As a result of the determination in step S106, if the target pixel is determined as the pixel in which the defect is to be detected (YES in step S106), the processing proceeds to step S107.

In step S107, the defect detection and correction unit 15a of the image correction processing circuit 15 detects whether the target pixel is a defect pixel by using a signal level of the target pixel input from the image processing circuit 13 and signal levels of the pixels adjacent to the target pixel. FIG. 4 illustrates a row of the pixels adjacent to the target pixel. A method for calculating a defect level will be described below in detail with reference to FIG. 4.

FIG. 4 shows that the signal level of the target pixel is Pn, signal levels of two pixels of the same color positioned immediately before the target pixel in a horizontal direction are Pn−2 and Pn−1, respectively, and signal levels of two pixels of the same color positioned immediately after the target pixel in the horizontal direction are Pn+1 and Pn+2, respectively. An average value Pave of those signal levels Pn−2, Pn−1, Pn+1, and Pn+2 of the four pixels positioned immediately before and after the target pixel and a signal level which is nearest to the average value Pave among the signal levels Pn−2, Pn−1, Pn+1,and Pn+2 of the four pixels are obtained as index values Pc. Then, a formula of "K=Pn−Pc" will be calculated in order to obtain a difference between the signal level Pn of the target pixel and the index value Pc. Accordingly, a defect level K of the target pixel can be obtained.

In the above description, it is determined whether the target pixel is the defect pixel by using the four pixels positioned side by side in the horizontal direction. However, it is not limited to the described method. More than two pixels aligned in the horizontal direction may also be used for the determination. Alternatively, more than two pixels aligned in the vertical direction, or more than two pixels respectively aligned in the horizontal direction and the vertical direction may be used for the determination.

In step S108, a type of the target pixel (whether the pixel is the OB section or the Null section) of which defect level K is calculated in step S107 is determined based on the address information stored in the first storage unit 15b. As a result of the determination instep S108, if the pixel is the OB section (YES in step S108), the processing proceeds to step S109. On the other hand, if the pixel is not the OB section (NO in step S108), the processing proceeds to step S110. In step S109, the defect detection threshold for the OB section is set. In step S110, the defect detection threshold for the Null section is set.

Then, the processing proceeds to step S111, and the defect detection and correction unit 15a compares the defect detection threshold set in step S109 or step S110 with the defect level K calculated in step S107 to determine whether the value of the defect level K is larger than the set threshold.

As a result of the determination, if the defect level K of the target pixel is larger than the set threshold, the pixel is designated as a candidate pixel to be corrected, i.e., the defect pixel. Although the defect detection threshold stored in the first storage unit 15b is used in the above determination, the determination whether the target pixel is the defect pixel also can be made when the image correction processing circuit 15 acquires the defect detection threshold stored in the second storage unit 16a or the third storage unit 16b.

In step S112, the defect detection and correction unit 15a replaces a signal value of the pixel which is determined as the defect pixel with the index value Pc calculated in step S107. With such a replacement of the pixel level, the signal level of the defect pixel may be corrected.

In step S113, the defect detection and correction unit 15a determines whether the defect detection target pixel is the final pixel. As a result of the determination, if the defect detection target pixel is not the final pixel (No in step S113), the processing returns to step S105. If the defect detection target pixel was the final pixel (YES in step S113), the defect pixel detection and correction processing is completed.

Points to be considered when the defect detection threshold is determined will be described below for each of the OB section and the Null section. Regarding the OB section, a level of a random noise contained in each pixel signal varies significantly according to the photographing conditions and the element temperature. Since the level of the random noise is low in cases of a high shutter speed and a low element temperature, even a defect pixel of a low defect level may adversely affect an image quality. Therefore, it is desirable to set a smaller defect detection threshold close to a direct-current (DC) component of the OB section (black level) and detect and correct even the defect pixel of smaller defect level. In the first exemplary embodiment, when a standard deviation of the random noise is $\sigma$, a defect of more than $3\sigma$ from a center of distribution (black level) is corrected.

On the other hand, in cases of a low shutter speed and a high element temperature, since the level of the random noise is high, the random noise may be detected as a defect pixel if the defect detection threshold is set to the small value close to the black level, and the pixel may be erroneously corrected. Accordingly, in the first exemplary embodiment, the threshold is set to a value equal to or more than $2\sigma$.

Figure 6:
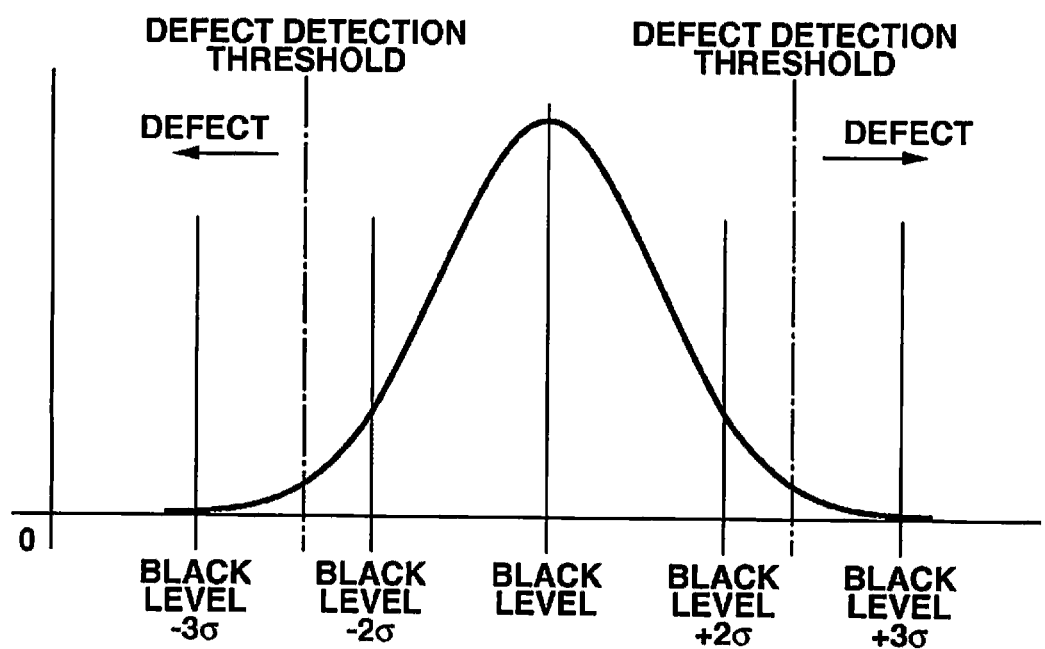
FIG. 6 illustrates a histogram and a range of an effective threshold of a pixel signal value of an OB section.

In other words, to detect the defect pixel which may adversely affect the image quality in the OB section in high accuracy without erroneous correction, as illustrated in FIG. 6, it is desirable to set the threshold between $2\sigma$ and $3\sigma$ from the center of distribution (black level) in the distribution of the levels of the random noise. In the first exemplary embodiment, an example that the threshold is set between $2\sigma$ and $3\sigma$ is described, however, a setting range of the threshold may be adjusted according to changes in the features of the image sensor, parameters of the image correction, or the like.

In the Null section, if the level of the random noise is low, the defect detection threshold is desirable to be set to a smaller value close to a black level of the Null section. However, in a case of the solid-state image sensor, such as a CMOS area sensor, in which many pixels are arranged in a matrix, since an electrical characteristic varies for every column, different offset signals may be superimposed on an output signal level. Therefore, when the defect detection threshold is determined, the column offset components may need to be considered.

More specifically, since the level of the random noise of the Null section is generally lower than that of the OB section, if the threshold is set based on the distribution of the random noise, the threshold becomes smaller than the column offset component. At the time, if the defect level is calculated in comparison with the signal levels of the adjacent pixels in a row direction, the column offset component is also erroneously detected as a defect, and the pixel may be erroneously corrected. In other words, to detect the defect pixel that may adversely affect the image quality in the Null section in high accuracy without erroneous correction, it is required to experimentally set the thresholds by obtaining the defect level at which an adverse effect to the image quality is tolerable as an upper limit, and the column offset component as a lower limit.

Figure 7:
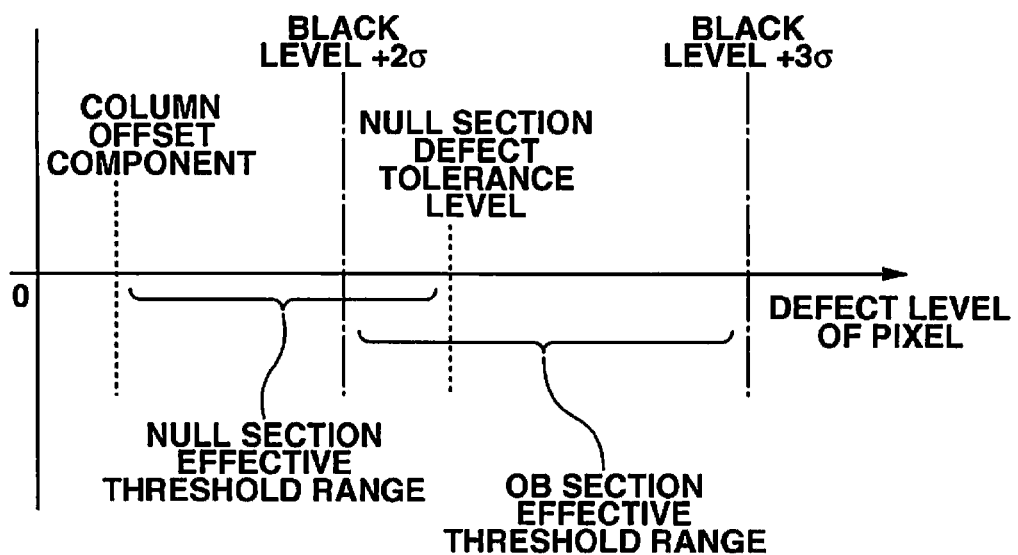
FIG. 7 illustrates a relationship of the range of the effective thresholds between the OB section and a Null section.

As illustrated in FIG. 7, a range in which an effective threshold for detecting the defect without the erroneous detection can be set is not always the same between the OB section and the Null section. Further, the ranges of and a positional relationship between the OB section and the Null section vary according to the photographing conditions and the element temperature. Therefore, to detect the defect in the OB section and the Null section in high accuracy, an individual threshold needs to be set for each of the OB section and the Null section.

Noise reduction processing to be performed to a pixel signal level after being subjected to the above defect correction processing will be described below.

Figure 8:
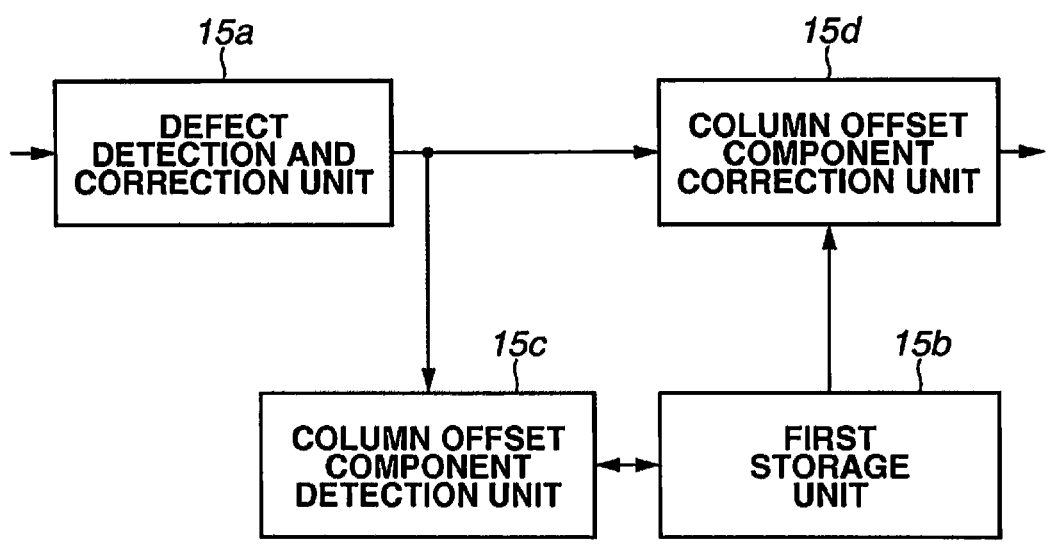
FIG. 8 illustrates an example of a configuration of a column offset correction processing unit.

Column offset correction processing performed in the Null section and the effective pixel section will be described below. The offset component in every column can be controlled by performing the column offset correction processing. More specifically, as illustrated in FIG. 8, only the column offset component is extracted from the pixel signal of the Null section which is output from the defect detection and correction unit 15a after being subjected to the defect correction by a column offset component detection unit 15c. The extracted column offset component is stored in the first storage unit 15b as a reference signal for correction. Then, the reference signal stored in the first storage unit 15b is subtracted from the pixel signal of the photographed effective pixel section by a column offset component correction unit 15d. Thus, the column offset component can be corrected.

Clamp processing performed in the OB section and the effective pixel section (OB clamp) will be described below. The DC component of the signal level (black level) of the OB section changes largely according to the usage environment such as the temperature or the exposure time. The change of the black level according to the usage environment can be controlled by performing the OB clamp processing.

Figure 9:
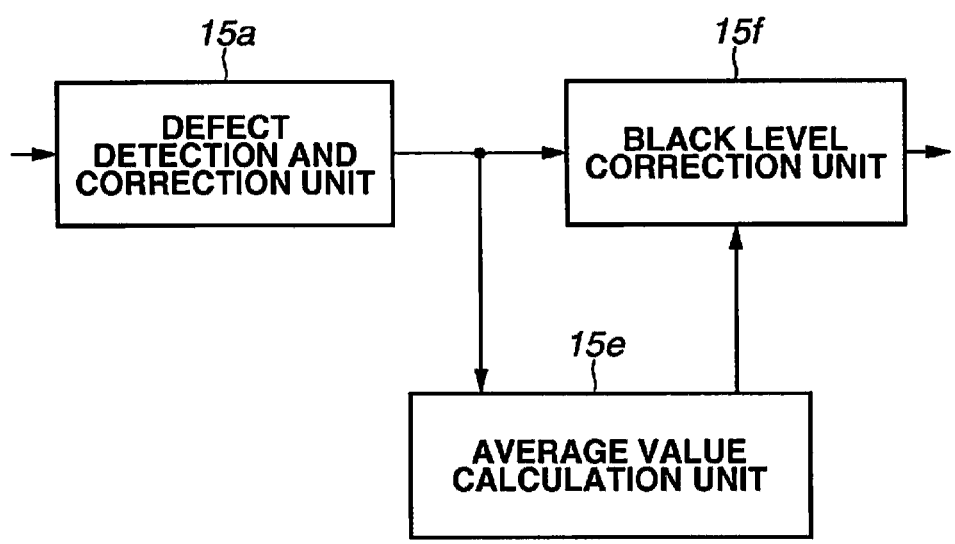
FIG. 9 illustrates an example of a configuration for performing an OB clamp processing.

More specifically, as illustrated in FIG. 9, in a row at which the black level is to be corrected, an average value is calculated by an average value calculation unit 15e based on the pixel signal of the OB section which is output from the defect detection and correction unit 15a after the defect of the pixel signal is corrected. The calculated average value is used as a reference signal for correction. Then, the black level of the effective pixel section is set based on the calculated reference signal in a black level correction unit 15f. Accordingly, the DC component generated due to the change of the photographing conditions can be removed.

In order to obtain a high quality image, it is desirable to perform both of the above described corrections. However, there is a common problem in the both correction processing that, if there is a defect pixel in the pixel section, malfunction may occur in each of the correction processing. If there is a defect pixel in the Null section, the defect pixel adversely affects the reference signal value of the column offset correction which is extracted by the column offset component detection unit 15c. Therefore, a vertical streak-shaped noise will be created if the column offset correction processing is performed using the reference signal value which has been adversely affected by the defect pixel.

For example, if there is a white defect within a target row where the reference signal is to be extracted, a value larger than the actual reference value will be extracted. As described above, if the correction is performed using the larger reference value, a dark vertical streak-shaped noise will be created.

On the other hand, if there is a black defect, a bright vertical streak-shaped noise will be created. Further, if there is a defect in the OB section, since the defect adversely affects the average value calculated in the average value calculation unit 15e, a horizontal streak-shaped noise will be created if the OB clamp processing is performed using the average value which has been adversely affected. In the OB clamp processing, similar to the column offset correction processing, a dark horizontal streak-shaped noise will be created if there is a white defect, and a bright horizontal streak-shaped noise will be created if there is a black defect.

In the above described defect detection and correction processing according to the first exemplary embodiment, the pixel is subjected to the noise reduction processing to correct the defect in high accuracy irrespective of the pixel configuration of the OB section or the Null section. Accordingly, frequency of generation of images of defective quality caused by the defect pixels can be reduced significantly.

Next, a second exemplary embodiment of the present invention will be described below. Procedures for detecting a defect level of a pixel and for determining a type of the pixel (range of addresses) in the second exemplary embodiment are similar to those of the first exemplary embodiment. Therefore, examples of the storage unit for storing the defect detection threshold and the processing for setting the defect detection threshold will be mainly described below.

In the above described first exemplary embodiment, the OB section and the Null section, which have different pixel configurations, individually have thresholds for detecting the defect, and each threshold is switched according to the photographing conditions and the element temperature. With regard to changes of the defect levels of the OB section and the Null section, the defect level of the OB section generally changes largely because of an adverse effect of the dark current as well as the temperature, whereas the defect level of the Null section changes little. In other words, the defect detection threshold of the OB section needs to be switched depending on the shutter speed, and the element temperature, whereas the defect detection threshold of the Null section may not need to be switched depending on the shutter speed and the element temperature.

Further, when images are continuously photographed, i.e., moving image is photographed, the defect detection threshold to the image correction processing circuit 15 needs to be set during a blanking period. During the blanking period, communication with the image processing circuit 13 and the TG 14 is also established. To establish all the communication within a certain period, an amount of communication data may need to be controlled.

In the second exemplary embodiment, the defect detection threshold for determining whether a pixel is the defect pixel is stored in the second storage unit 16a or the third storage unit 16b for every photographing condition or the element temperature. More specifically, the defect detection threshold for the OB section is stored with respect to each condition of the sensitivity, the shutter speed, the photographing mode, and the element temperature. On the other hand, the defect detection threshold for the Null section is stored with respect to each condition of the sensitivity and the photographing mode. In other words, the defect detection threshold for detecting the defect of the Null section to be used in the defect detection and correction unit 15a is not switched according to the changes of the element temperature and the shutter speed. Accordingly, the amount of communication when the control unit 18 sets the defect detection threshold to the image correction processing circuit 15 can be controlled.

Each unit of the defect pixel detection apparatus according to the above described exemplary embodiments of the present invention can be realized by executing a program stored in a RAM or a ROM of a computer. Such program and a computer readable recording medium storing the above program fall within the scope of the present invention.

Further, the present invention can be applied to, for example, a system, an apparatus, a method, a program, or a storage medium. More specifically, the present invention is applicable to a system including a plurality of devices, and an apparatus including a single device.

In the present invention, a program of software which executes each processing in the above described defect detection and correction method (a program corresponding to processing in the flow chart of FIG. 3 in the exemplary embodiments) can be supplied directly or remotely to a system or an apparatus. The present invention also encompasses a case where the functions of the above exemplary embodiments are achieved by a computer of the system or the apparatus reading out and executing the above supplied program code.

Therefore, the program code itself to be installed into the computer to implement the functional processing of the present invention by the computer also can realize the present invention. In other words, the present invention encompasses the computer program itself which realizes the functional processing of the present invention.

In this case, the program may be formed into any one of an object code, a program executed by an interpreter, a script data to be supplied to an operating system (OS), or the like as far as they have a function of the program.

Various recording media can be used as the recording medium for supplying the program. For example, such recording media include a floppy disk, a hard disk, an optical disk, a magnetooptical disk (MO), a compact disk read only memory (CD-ROM), a compact disk recordable (CD-R), a compact disk rewritable (CD-RW), a magnetic tape, a non-volatile memory card, a ROM, and a digital versatile disk (DVD) (e.g., DVD-ROM and DVD-R).

The program can be supplied in the following manner. A client's computer is connected to a website via Internet using a browser. Then, the computer program itself of the present invention or a file containing a compressed computer program and an automatic installation function thereof is downloaded from the website to a recording medium such as a hard disk, so that the program of the present invention can be supplied.

Further, the program can be supplied such that the program code of the program of the present invention is divided into a plurality of files to allow the user to download the files from different websites. In other words, a world wide web (WWW) server that allows a plurality of users to download a program for realizing the functional processing of the present invention falls also within the scope of the present invention.

Further, the present invention can be realized in the following manner. The program is encrypted, stored in a storage medium such as a CD-ROM, and distributed to users. The users who satisfy predetermined conditions are permitted to download key information for decrypting the program from the website via the Internet. Then, the user executes the encrypted program by using the key information to install the program into the computer.

Still further, the function of the above described exemplary embodiments can be realized such that the computer executes the read out program, or the OS or the like running on the computer performs apart or all of the actual processing.

Furthermore, the function of the above described exemplary embodiments can also be realized in the following manner. The program read out from the recording medium is written into a memory of a function expansion board inserted into the computer or a memory of a function expansion unit connected to the computer. Then, the CPU or the like of the function expansion board or the function expansion unit performs a part or all of the actual processing based on an instruction of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A defect pixel detection apparatus comprising:
    an image sensor that includes a first pixel configured to include a photoelectric conversion element and an output unit configured to output a pixel signal generated by the photoelectric conversion element, and a second pixel configured not to include a photoelectric conversion element or an output unit;
    a defect level acquiring unit configured to acquire a defect level of a target pixel in the image sensor; and
    a defect pixel determination unit configured to determine a defect detection threshold based on whether the target pixel is a first pixel or a second pixel and to determine whether the target pixel is a defect pixel by comparing the defect level of the target pixel with the defect detection threshold.

2. The defect pixel detection apparatus according to claim 1, further comprising
    a temperature detection unit configured to detect a temperature of an area adjacent to the image sensor,
    wherein the defect pixel determination unit sets the defect detection threshold according to the temperature detected by the temperature detection unit.

3. The defect pixel detection apparatus according to claim 2, wherein the defect pixel determination unit does not change the defect detection threshold of the second pixel even if the temperature detected by the temperature detection unit changes.

4. The defect pixel detection apparatus according to claim 1, wherein the defect pixel determination unit sets the defect detection threshold according to photographing conditions including at least one of a photographing mode, a shutter speed, and sensitivity.

5. The defect pixel detection apparatus according to claim 4, wherein the defect pixel determination unit does not change the defect detection threshold of the second pixel even if the shutter speed changes.

6. The defect pixel detection apparatus according to claim 1, wherein the defect level is a difference between a signal level of the target pixel and an index value calculated based on a signal level of a pixel adjacent to the target pixel.

7. A method for detecting a defect pixel of an image sensor that includes a first pixel configured to include a photoelectric conversion element and an output unit configured to output a pixel signal generated by the photoelectric conversion element, and a second pixel configured not to include a photoelectric conversion element or an output unit, the method comprising:

acquiring a defect level of a target pixel in the image sensor; and determining a defect detection threshold based on whether the target pixel is a first pixel or a second pixel and determining whether the target pixel is a defect pixel by comparing the defect level of the target pixel with the a defect detection threshold.

8. A non-transitory computer-readable medium storing a computer program for causing a computer to execute a method for detecting a defect pixel of an image sensor that includes a first pixel configured to include a photoelectric conversion element and an output unit configured to output a pixel signal generated by the photoelectric conversion element, and a second pixel configured not to include a photoelectric conversion element or an output unit, wherein the computer program comprises:

acquiring a defect level of a target pixel in the image sensor; and determining a defect detection threshold based on whether the target pixel is a first pixel or a second pixel and determining whether the target pixel is a defect pixel by comparing the defect level of the target pixel with the defect detection threshold.

* * * * *